United States Patent [19]
Gardner et al.

[11] Patent Number: 5,089,218
[45] Date of Patent: Feb. 18, 1992

[54] WATER COOLED NUCLEAR REACTOR WITH A DIAPHRAGM PRESSURIZERS FOR LOW PRESSURES AND TEMPERATURES

[75] Inventors: Frederick J. Gardner, Chaddesden; Dewi J. Morris, Chellaston, both of England

[73] Assignee: Rolls-Royce and Associates Limited, Derby, England

[21] Appl. No.: 381,976

[22] Filed: Jul. 19, 1989

[30] Foreign Application Priority Data

Aug. 1, 1988 [GB] United Kingdom ............ 8818284

[51] Int. Cl.$^5$ .......................................... G21C 13/00
[52] U.S. Cl. ................................. 376/406; 376/283; 376/307
[58] Field of Search ............ 376/283, 285, 406, 307

[56] References Cited

U.S. PATENT DOCUMENTS

| | | | |
|---|---|---|---|
| 3,305,450 | 2/1967 | Maldague | 376/307 |
| 3,312,595 | 4/1967 | Hackney | 376/307 |

FOREIGN PATENT DOCUMENTS 3533016  3/1987  Fed. Rep. of Germany.

OTHER PUBLICATIONS

English Abstract of German Patent DE 3533016-A.

*Primary Examiner*—Brooks H. Hunt
*Assistant Examiner*—Frederick H. Voss
*Attorney, Agent, or Firm*—Cushman, Darby & Cushman

[57] ABSTRACT

A water cooled nuclear reactor comprises a reactor core, a primary water coolant circuit and a pressuriser arranged as an integral unit in a pressure vessel. The pressure vessel is divided into an upper chamber and a lower chamber by a casing, the reactor core and primary coolant circuit are arranged in the lower chamber and the pressuriser is arranged in the upper chamber. A movable diaphragm is positioned in the upper chamber, and is sealingly secured to the casing by a bellows arrangement to divide the upper chamber into a water filled space and a gas filled space. A plurality of surge ports interconnect the water space with the primary coolant circuit. The diaphragm moves to accommodate changes in the volume or pressure of the water in the primary coolant circuit and water space. The diaphragm is loaded by springs and dampers to prevent oscillation of the diaphragm. Alternatively the diaphragm may be an elastic membrane.

33 Claims, 3 Drawing Sheets

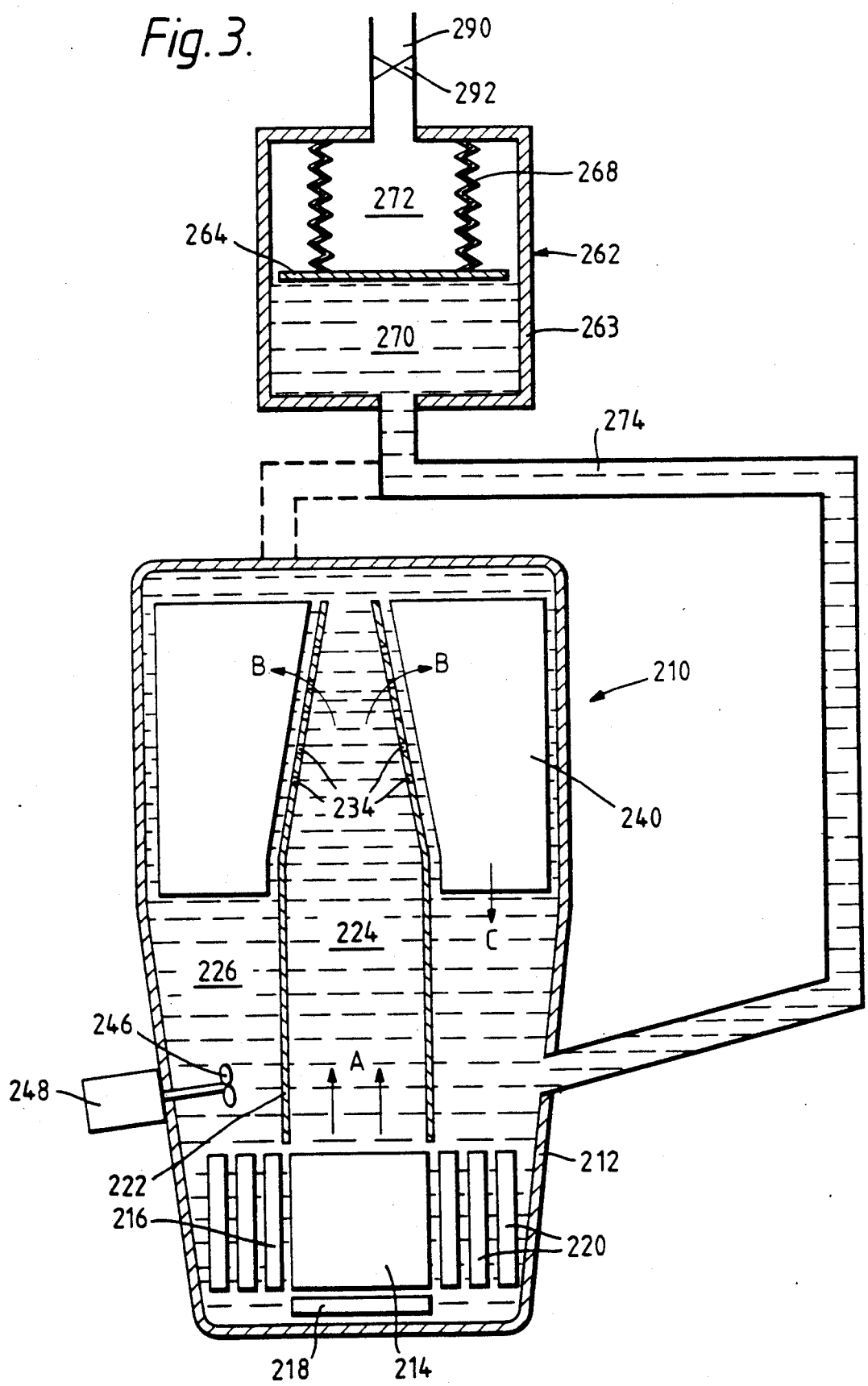

WATER COOLED NUCLEAR REACTOR WITH A DIAPHRAGM PRESSURIZERS FOR LOW PRESSURES AND TEMPERATURES

The present invention relates to water cooled nuclear reactors, and pressurizers therefor, and is particularly of benefit for small, low pressure, low temperature water cooled nuclear reactors.

The pressurizer of a pressurized water nuclear reactor (PWR) of the prior art is essentially a volume of saturated water and vapour in thermodynamic equilibrium in a vessel which communicates with the primary circuit via a surge line.

The present invention seeks to provide a pressurized water cooled nuclear reactor, and a pressurized therefor, in which normal or abnormal changes in water volume or water space can be accommodated by mechanical means not requiring support systems such as electrical immersion heaters and their power supplies as required by prior art saturated water pressurizers.

Accordingly the present invention provides a water cooled nuclear reactor comprising a reactor core, a primary water coolant circuit arranged to cool the reactor core, a pressurizer, the reactor core, and at least a portion of the primary coolant circuit being located in a pressure vessel, the pressurizer having a movable diaphragm sealingly secured to a pressurizer pressure vessel to divide the pressuriser pressure vessel into a first water space and a second fluid space, the second fluid space being arranged to contain a gas, at least one surge port means which communicates between the pressurizer and the primary coolant circuit to connect the first space of the pressurizer with the primary coolant circuit, the diaphragm being movable so as to allow changes in the volume or pressure of the water in the first space of the pressurizer and the primary coolant circuit.

The reactor core, the primary water coolant circuit and the pressurizer may be arranged as an integral unit enclosed by an integral pressure vessel, at least one casing being located in the integral pressure vessel to substantially divide the integral pressure vessel into a first chamber and a second chamber, the pressurizer being located in the first chamber, the reactor core and the primary water coolant circuit being located in the second chamber.

The casing may divide the pressure vessel into a first vertically upper chamber and a second vertically lower chamber.

The casing may comprise an annular member which extends downwards from the peripheral region thereof, the annular member being sealingly secured to the pressure vessel to form an annular lower portion of the first water space.

The casing may comprise an annular member which is sealingly secured to and extends downwards from the pressure vessel, the annular member having the at least one surge port means at its lower end.

The diaphragm may be sealingly secured to the pressure vessel by bellow means.

The diaphragm may be sealingly secured to the casing by bellow means.

The diaphragm may be spring loaded.
The bellow means may comprise a spring.
The diaphragm may have damper means.
The bellow means may be arranged to expand with an increase in the volume or pressure of the water.
The bellow means may be arranged to contract with an increase in the volume or pressure of the water.

The reactor may be arranged in the lower region of the second chamber, the primary coolant circuit comprising a riser passage to convey relatively hot water and steam to a heat exchanger, and a downcomer passage to convey relatively cool water from the heat exchanger to the reactor core.

The riser passage may be defined by a hollow cylindrical member, the downcomer passage being defined between the hollow cylindrical member and the pressure vessel.

The heat exchanger may be positioned in an upper region of the downcomer passage.

The reactor core may be positioned in the lower region of the second chamber, the primary coolant circuit comprising a riser passage defined by a hollow cylindrical member to convey relatively hot water and steam to a heat exchanger or boiler, and a downcomer passage defined between the hollow cylindrical member and the pressure vessel to convey relatively cool water from the heat exchanger, or boiler, to the reactor core.

The casing may be positioned coaxially with the hollow cylindrical member, the casing extending downwards from the pressure vessel into the hollow cylindrical member.

The pressure vessel may have a vent to interconnect the second fluid space with atmosphere.

The vent may have a relief valve.
The diaphragm may be an elastic membrane.

A pressurizer for a water cooled nuclear reactor may comprise a pressure vessel, a movable diaphragm sealingly secured to the pressure vessel to divide the pressure vessel into a first space and a second space, the first space being arranged to interconnect with the water cooled nuclear reactor for the supply of water therebetween, the second space being arranged to contain a gas, the diaphragm being movable so as to allow changes in the volume or pressure of the water in the first space of the pressurizer and the water cooled nuclear reactor.

The diaphragm may be sealingly secured to the pressure vessel by bellow means.
The diaphragm may be spring loaded.
The bellow means may comprise a spring.
The diaphragm may have damper means.
The bellow means may be arranged to expand with an increase in the volume or pressure of the water.
The bellow means may be arranged to contract with an increase in the volume or pressure of the water.

The pressure vessel may have a vent to interconnect the second space with atmosphere.

The vent may have a relief valve.
The diaphragm may be an elastic membrane.

The present invention will be more fully described by way of example, with reference to the accompanying drawings, in which:

FIG. 3 is a vertical cross-sectional view of a third embodiment of a water cooled nuclear reactor, with a pressurizer according to the present invention.

Figure 1:
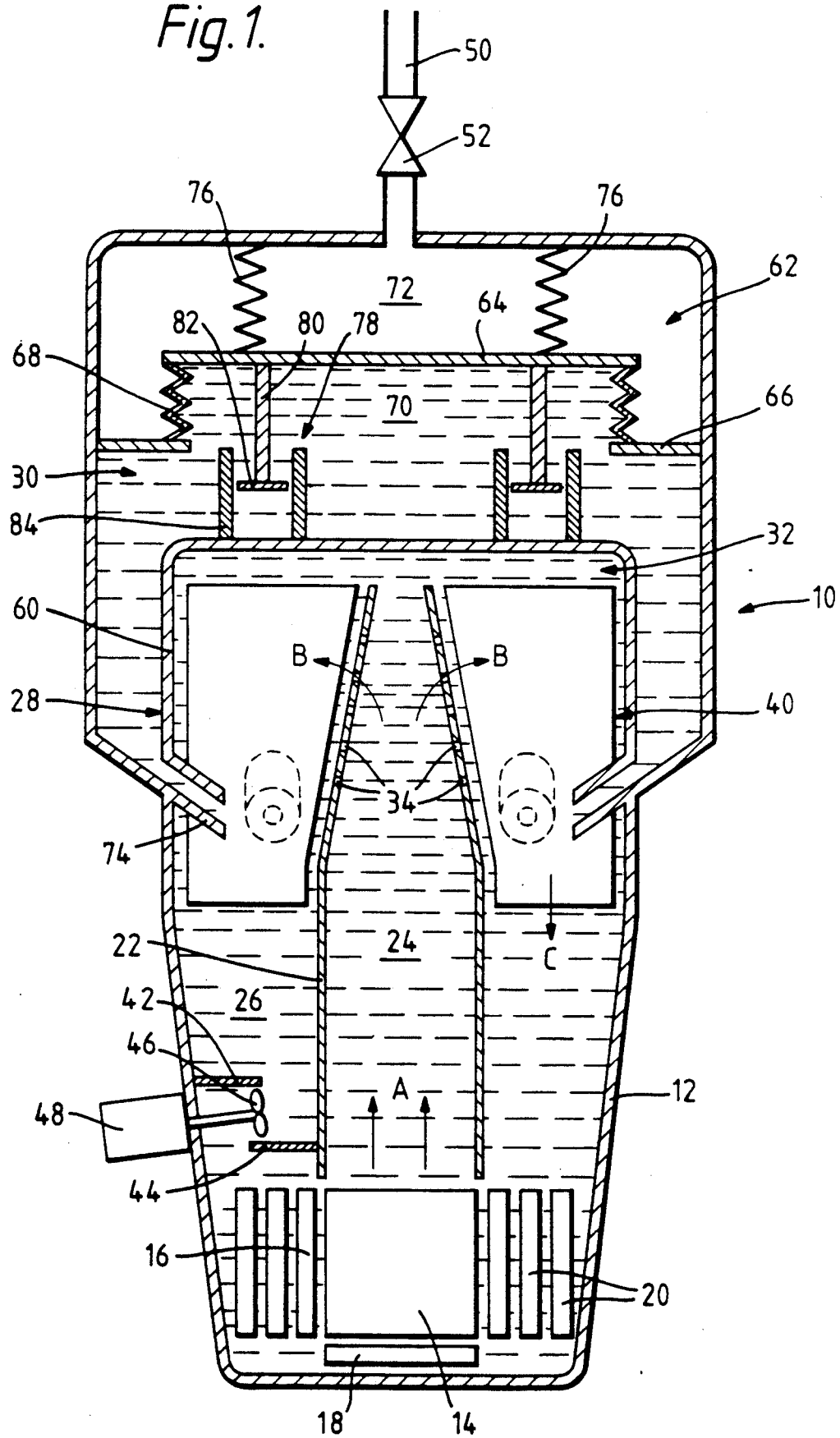
FIG. 1 is a vertical cross-sectional view of a water cooled nuclear reactor, with a pressurizer according to the present invention.

A water cooled nuclear reactor 10 with integral pressurizer 62 according to the present invention is shown in FIG. 1. This is a pressurized water reactor with an indirect cooling system. The water cooled nuclear reactor 10 comprises a pressure vessel 12 within which is positioned a reactor core 14. The reactor core 14 is positioned at the lower region of the pressure vessel 12, and the reactor core 14 is surrounded by a neutron reflector 16. A thermal shield 18 is positioned below the reactor core 14 and thermal shields 20 are positioned so as to surround the neutron reflector 16. The thermal shields 18,20 protect the pressure vessel 12 from radiation emanating from the reactor core 14.

A primary water coolant circuit is used to cool the reactor core 12, and the primary water coolant circuit may use a forced or a natural circulating arrangement. The primary water coolant circuit comprises a hollow cylindrical member 22 which is aligned with and positioned vertically above the reactor core 14 to define a riser passage 24 therein for the natural vertically upward flow of relatively hot primary coolant from the reactor core 14. An annular downcomer passage 26 is defined between the hollow cylindrical member 22 and the pressure vessel 12 for the natural vertically downward return flow of relatively cool primary coolant to the reactor core 14.

A casing 28 is positioned in the pressure vessel 12, and divides the pressure vessel 12 into a first vertically upper chamber 30 and a second vertically lower chamber 32.

The cylindrical member 22 extends towards the top of the lower chamber 32 defined by the casing 28 and the pressure vessel 12, and the upper region of the cylindrical member 22 is provided with apertures 34 for the distribution of flow of the primary water coolant from the riser passage 24 to the heat exchanger region of the annular downcomer passage 26.

A secondary coolant circuit takes heat from the primary water coolant circuit to produce vapor for a turbine or hot fluid for other purposes. The secondary water coolant circuit comprises a heat exchanger, which for example is a steam generator, 40 which is annular and positioned coaxially in the upper region of the annular downcomer passage 26. The heat exchanger 40 comprises one or more tubes, which are arranged in the annular vessel 42, which receive fluid from a supply of fluid via a supply pipe and inlet header, and which supply vapor to a turbine or hot fluid for other purposes via an outlet header and a supply pipe.

The steam tubes are of any suitable configuration for example, as is well known in the art, the tubes could be u-tubes or helically coiled tubes which extend between the inlet header and outlet header. The helically coiled tubes may be arranged in tube bundles arranged circumferentially with the annular vessel 42. British Patent No 1386813 discloses a pressurized water reactor which has helically coiled tubes arranged in an annular steam generator, although the primary water coolant is pumped therethrough normally, natural water circulation takes place if there is a pump failure, this arrangement does not have an integral pressurizer.

The pressure vessel 12 and the cylindrical member 22 are provided with members 42 and 44 respectively which extend into the downcomer passage 26. A pump 46 is positioned in the downcomer passage 26 between the members 42 and 44 to pump the primary water coolant through the primary water coolant circuit. The pump 46 is driven by a motor 48, which is positioned outside of the pressure vessel 12.

The casing 28 has an annular member 60 which extends vertically downwards from the peripheral region of the casing 28. The bottom region of the annular member 60 is secured to the pressure vessel 12.

The pressurizer 62 is positioned within the pressure vessel 12 in the upper chamber 30 formed between the casing 28 and the pressure vessel 12. A movable diaphragm 64 is positioned in the upper chamber 30, and is sealingly secured to a flange 66 which extends inwardly from the pressure vessel 12. A bellows 68 arrangement secures the diaphragm 64 to the flange 66, and also forms a seal between the diaphragm 64 and flange 66. The diaphragm 64 divides the upper chamber 30 into a first water space 70 and a second fluid, or gas space 72. The water space 70 is formed below the diaphragm 64 and the fluid, or gas space 72 is formed above the diaphragm 64. The water space 70 is defined by the pressure vessel 12, the casing 28, the diaphragm 64 and the bellows 68, and the fluid space 72 is defined by the pressure vessel 12, the diaphragm 64 and the bellows 68.

The bottom region of the annular member 60 is provided with a plurality of circumferentially arranged surge ports 74. The surge ports 74 fluidly communicate between the water space 70 and the annular downcomer passage 26 of the primary coolant circuit, and as shown may extend into the heat exchanger 40 or into the downcomer beneath the heat exchanger.

A plurality of springs 76 are provided which are secured to the diaphragm 64 and the pressure vessel 12 so as to preload the diaphragm, alternatively springs could be built into the bellows 68.

A plurality of dampers 78 are provided to control the movement of the diaphragm 64, so as to give suitable transient and frequency response characteristics. The dampers 78 are of the dashpot type and each comprises a rod 80 and piston 82, and a cylinder 84. Each rod 80 and piston 82 is secured to the diaphragm 64 and the cylinders 84 are secured to the casing 28. Each rod 80 and piston 82 is arranged coaxially of an associated cylinder 84 and is arranged to move axially therein in response to movement of the diaphragm. The cylinders 84 are filled with water to impede the movement of the pistons 82 so as to damp undesirable oscillations of the diaphragm 64. Other suitable dampers could be used to achieve the same function.

In operation of the water cooled nuclear reactor 10 the fission of nuclear fuel in the reactor core 14 produces heat. The heat is carried away from the reactor core 14 by the primary water coolant circuit. The heating of the water in the vicinity of the reactor core 14 causes the water to flow in an upwards direction as shown by arrows A through the riser passage 24, the primary water then flows through the flow distribution apertures 34 in the cylindrical member 22 and apertures 44 in the annular vessel 42 of the steam generator, heat exchanger i.e. 40 to pass over heat exchanger tubes as shown by arrows B. The primary water gives heat to the secondary fluid in the tubes on passing through the heat exchanger 40. The primary water then returns to the reactor core 14 through the annular downcomer passage 26 as shown by arrow C.

If there is a positive volume surge in or expansion of, the water of the primary water coolant circuit, due to an excess of reactor power over heat exchanger load, a portion of the primary coolant flows from the annular downcomer passage 26 through the surge ports 74 into the water space 70. This produces an increase of the volume of the water space 70, and a corresponding reduction of the volume of fluid space 72, by causing the diaphragm 64 and bellows 68 to move against the spring 76 load, the bellows 68 expanding.

If there is a negative volume surge in or contraction of the water of the primary water coolant circuit, due to a deficit in reactor power over heat exchanger load, a portion of the water flows from the water space 70 through the surge ports 74 into the annular downcomer passage 26. There is therefore a decrease of the volume of the water space 70, and a corresponding increase of the volume of fluid space 72, by the diaphragm 64 and bellows 68 moving under the action of the spring 76.

The spring 76 loaded diaphragm 64 and bellows 68 allows the primary water coolant to expand or contract as the temperature of the water varies while the water is compressed over the full operating temperature range, and accommodates all normal or abnormal changes in the water volume without overpressurizing the primary coolant circuit of the reactor.

The fluid space 72 volume is arranged so that at the operating pressure of the primary coolant circuit, the diaphragm 64 and bellows 68 can expand to accommodate the largest volume surge of the water.

The diaphragm 64 must be strong enough and flexible enough to keep the water compressed. The diaphragm may be an elastic membrane.

The diaphragm 64 and bellows 68 pressurizer does not have a constant pressure steady state characteristic, the pressure rises or falls with the temperature. The fluid space 72 is a closed gas filled space, and in this arrangement the load on the spring loaded diaphragm and bellows is reduced. The gas space is fitted with a relief valve 52 and vent 50 to relieve over pressures.

The water pressure is the sum of the gas pressure in the fluid space 72 and a pressure component due to the diaphragm 64. There is a temperature and a pressure for the gas and water for which, because of the gas pressure, there is no load on the diaphragm 64 and bellows 68, it is preferable to design for operation below these temperatures and pressures. An alternative arrangement dispenses with the relief valve leaving the gas space open to atmospheric pressure via the vent.

The water cooled nuclear reactor as shown in FIG. 1 is suitable for use where vertical height, headroom, of the reactor is not a constraint.

Figure 2:
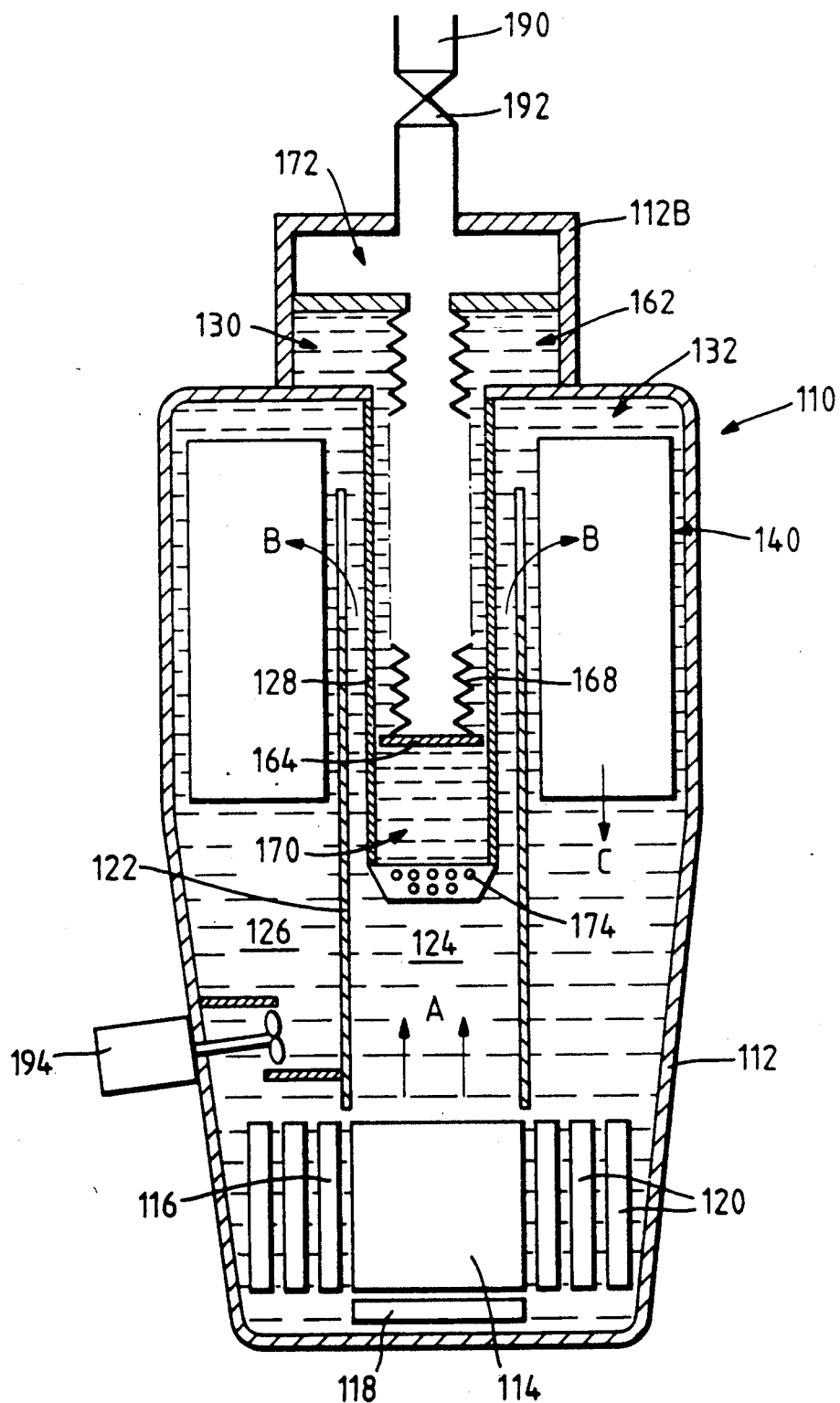
FIG. 2 is a vertical cross-sectional view of a second embodiment of a water cooled nuclear reactor, with a pressurizer according to the present invention.

A second embodiment of a water cooled nuclear reactor 110 with integral pressurizer 162 according to the present invention is shown in FIG. 2. This is a pressurized water reactor of the type with an indirect cooling system. The water cooled nuclear reactor 110 comprises a pressure vessel 112 within which is positioned a reactor core 114. The reactor core 114 is positioned at the lower region of the pressure vessel 112, and the reactor core 114 is surrounded by a neutron reflector 116. A thermal shield 120 is positioned so as to surround the neutron reflector 116 to protect the pressure vessel 112 from radiation emanating from the reactor core 114.

A circulating primary water coolant circuit is used to cool the reactor core 114. The primary coolant circuit comprises a hollow cylindrical member 122 which is aligned with and positioned vertically above the reactor core 114 to define a riser passage 124 for the natural vertically upward flow of relatively hot primary coolant from the reactor core 114. An annular downcomer passage 126 is defined between the hollow cylindrical member 122 and the pressure vessel 112 for the natural vertically downward return flow of relatively cool primary coolant to the reactor core 114.

A casing 128 is positioned in the pressure vessel 112, and divides the pressure vessel 112 into a first chamber 130 and a second chamber 132. The reactor core 114 and the primary coolant circuit are arranged in the second chamber 132.

The cylindrical member 122 has apertures at its upper region for the flow of primary water coolant from the riser passage 124 to the annular downcomer passage 126.

A secondary fluid circuit takes heat from the primary water coolant circuit for whatever purpose the plant is designed for. The secondary fluid circuit comprises a steam exchanger 140 which is annular and positioned coaxially in the upper region of the annular downcomer passage 126. The heat exchanger 140 is arranged in an annulus. The heat exchanger 40 also comprises one or more tubes which are arranged in the annulus which receive fluid from a supply of secondary fluid via a supply pipe and inlet header, and which supply hot fluid or vapor via an outlet header and a supply pipe.

The casing 128 comprises an annular member which is sealingly secured to the pressure vessel 112. The casing 128 extends downwards from the pressure vessel 112, and the casing 128 is positioned coaxially with the hollow cylindrical member 122 and extends downwards into the hollow cylindrical member 122.

The pressurizer 162 is positioned within the pressure vessel 112 in the first chamber 130 formed between the casing 128 and an upper portion 112B of the pressure vessel 112. A movable diaphragm 164 is positioned in the first chamber 130, and is sealingly secured to the pressure vessel 112. A bellows 168 arrangement secures the diaphragm 164 to the pressure vessel 112, and also forms a seal between the diaphragm 164 and pressure vessel 112. The diaphragm 164 divides the first chamber 130 into a first water space 170 and a second fluid space 172. The water space 170 is formed below the diaphragm 164 and the fluid space 172 is formed above the diaphragm 164. The water space 170 is defined by the pressure vessel 112, the casing 128, the diaphragm 64 and the bellows 168, and the fluid space 172 is defined by the pressure vessel 112, the diaphragm 164 and the bellows 168.

The bottom region of the casing 128 is provided with at least one surge port 174, which fluidly communicates between the water space 170 and the riser passage 124 of the primary coolant circuit.

The bellows 168 has built in springs to preload the diaphragm 164.

The diaphragm 164 itself acts as a damper in this arrangement, the diaphragm 164 acts as a piston of a dashpot damper, and the casing 128 acts as a cylinder of the dashpot damper.

This embodiment operates in substantially the same manner as the embodiment in FIG. 1, the bellows 168 however contracts when there is a positive volume surge, and expands when there is a negative volume surge. Water flows between the riser passage 124 of the primary coolant circuit and the first water space 170.

The fluid space 172 has a vent 190 to connect the gas in the fluid space to atmosphere. The fluid space could be either connected to atmosphere permanently, or through a relief valve 192 positioned in the vent 190 to open at a predetermined pressure. In the latter the space between the diaphragm and the relief valve would be filled with a predetermined mass of gas.

A pump 194 may be provided to assist the primary water coolant circulation.

The water cooled nuclear reactor shown in FIG. 2 is suitable for use where there is limited vertical height, headroom, available for the reactor, i.e. produces a more compact reactor arrangement.

Water cooled nuclear reactors with integral pressurizers according to the present invention cannot have control rod mechanisms suspended from the top of the pressure vessel, which extend downwards through the pressurizer, casing and riser passage to the reactor core, because of the diaphragm. Other methods of controlling the reactor core are required, such as by adjusting neutron absorption in the neutron reflector in the case of a very small reactor. The neutron reflector controls the escape of neutrons from the reactor core, and thus can be used to control the reactivity of the reactor core, such a control process is well known in the art, and is disclosed in U.S. Pat. No. 3,687,804. Alternatively hydraulic control rod actuators may be provided which do not require mechanical penetration through the diaphragm.

Water cooled nuclear reactors with integral pressurizers according to the present invention could be used to provide low grade heat or used with moderate temperature organic or steam Rankine cycle power conversion to provide relatively low cost, low power plants between 200 KW and 10 MW of electricity.

Water cooled nuclear reactors with integral pressurizers are particularly suitable for operation at relatively low temperatures and pressures. Typical temperature and pressure range is 100°-200° C. and 2 to 30 bars.

An advantage of the water cooled nuclear reactor with integral pressuriser is that it accommodates changes in the primary water coolant volume or pressure without overpressurising the primary coolant circuit of the reactor. Also the pressuriser does not flood with water, and lower system pressure can be used.

Dispersed or separate pressurizers may be provided with a diaphragm, a bellow arrangement, springs and dampers within a pressure vessel to operate in substantially the same manner.

FIG. 3 illustrates a pressurized water cooled nuclear reactor 210 in which the pressurizer 262 is separate, or dispersed from the pressurized water cooled nuclear reactor with an integral primary water coolant circuit arrangement.

The pressurized water cooled nuclear reactor 210 comprises a pressure vessel 212 within which is positioned a reactor core 214. The reactor core 214 is again positioned at the lower region of the pressure vessel 212, and the reactor core 214 is surrounded by neutron reflector 216. A thermal shield 220 is positioned so as to surround the neutron reflector 216 to protect the pressure vessel 212 from radiation emanating from the reactor core 214.

A circulating primary water coolant circuit is used to cool the reactor core 214. The primary water coolant circuit comprises a hollow cylindrical member 222 which is aligned with and positioned vertically above the reactor core 214 to define a riser passage 224 for the natural vertically upward flow of relatively hot primary coolant from the reactor core 214. An annular downcomer passage 226 is defined between the hollow cylindrical member 222 and the pressure vessel 212 for the natural vertically downward return flow of relatively cool primary coolant to the reactor core 214.

The cylindrical member 222 has flow distribution apertures 234 at its upper region for the flow of primary water coolant from the riser passage 224 to the annular downcomer passage 226.

A heat exchanger 240 of a secondary fluid coolant takes heat from the primary water coolant circuit for whatever purpose the plant is designed for. The heat exchanger 240 is annular and is positioned coaxially in the upper region of the annular downcomer passage 226.

The pressurizer 262 is positioned above the pressure vessel 12, and comprises a separate pressure vessel 263. The pressurizer may equally well be arranged level with the pressure, vessel. A movable diaphragm 264 is positioned in the pressure vessel 263 and is sealingly secured to the pressure vessel 263. A bellows 268 arrangement secures the diaphragm 264 to the pressure vessel 263, and also forms a seal between the diaphragm 264 and the pressure vessel 263. The diaphragm 264 divides the interior of the pressure vessel 263 into a first water space 270 and a second fluid space 272.

A surge line 274 interconnects the water space 270 of the pressurizer 262 with the downcomer passage 226 of the primary water coolant circuit. Alternately the surge port 274 may interconnect with the primary water coolant circuit at the top of the pressure vessel 212 or other suitable position.

The fluid space 272 has a vent 290 and a valve 292 to connect the gas in the fluid space to atmosphere.

The embodiment in FIG. 2 operates substantially the same as the embodiments in FIGS. 1 and 2.

A separate, or dispersed pressurizer with a diaphragm as shown in the embodiment in FIG. 3 may equally well be applicable to a low pressure dispersed, or loop type, pressurized water nuclear reactor i.e. a pressurized water nuclear reactor in which the heat exchanger of the secondary coolant fluid circuit is not integral in the pressure vessel of the plant.

We claim:

1. A water cooled nuclear reactor comprising a pressure vessel, a reactor core, a primary water coolant circuit, a pressurizer, the reactor core and at least a portion of the primary water coolant circuit being located in a pressure vessel, the primary water coolant circuit being arranged to cool the reactor core, the pressurizer having a diaphragm and a pressurizer pressure vessel, the diaphragm being movable and being sealingly secured to the pressurizer pressure vessel to divide the pressurizer pressure vessel into a first water space and a second fluid space, the second fluid space being arranged to contain a gas, and at least one surge port means which communicates between the pressurizer and the primary water coolant circuit to connect the first space of the pressurizer with the primary water coolant circuit, the diaphragm being movable so as to allow changes in the volume or pressure of the water in the first space of the pressurizer and the primary water coolant circuit, sealing means interconnecting and securing the diaphragm to said pressurizer pressure vessel to form a seal and for allowing relative movement between said diaphragm and said pressurizer pressure vessel.

2. A water cooled nuclear reactor as claimed in claim 1 in which the reactor core, the primary water coolant circuit and the pressurizer are arranged as an integral unit enclosed by an integral pressure vessel, at least one casing being located in the integral pressure vessel to substantially divide the integral pressure vessel into a first chamber and a second chamber, the pressurizer being located in the first chamber, the reactor core and the primary water coolant circuit being located in the second chamber.

3. A water cooled nuclear reactor comprising a pressure vessel, a reactor core, a primary water coolant circuit, a pressurizer, the reactor core and at least a portion of the primary water coolant circuit being located in a pressure vessel, the primary water coolant circuit being arranged to cool the reactor core, the presurizer having a diaphragm and a pressurizer pressure vessel, the diaphragm being movable and being sealingly secured to the pressurizer pressure vessel to divide the pressurizer pressure vessel into a first water space and a second fluid space, the second fluid space being arranged to contain a gas, and at least one surge port means which communicates between the pressurizer and the primary water coolant circuit to connect the first space of the pressurizer with the primary water coolant circuit, the diaphragm being movable so a to allow changes in the volume or pressure of the water in the first space of the pressurizer and the primary water coolant circuit, the reactor core, the primary water coolant circuit and the pressurizer being arranged as an integral unit enclosed by an integral pressure vessel, at least one casing being located in the integral pressure vessel to substantially divide the integral pressure vessel into a first chamber and a second chamber, the pressurizer being located in the first chamber, the reactor core and the primary water coolant circuit being located in the second chamber.

4. A water cooled nuclear reactor as claimed in claim 2 in which the casing divides the pressure vessel into a first vertically upper chamber and a second vertically lower chamber.

5. A water cooled nuclear reactor as claimed in claim 4 in which the casing comprises an annular member which extends downwards from the peripheral region thereof, the annular member being sealingly secured to the pressure vessel to form an annular lower portion of the first water space.

6. A water cooled nuclear reactor as claimed in claim 2 or 3 in which the casing comprises an annular member which is sealingly secured to and extends downwards from the pressure vessel, the annular member having the at least one surge port means at its lower end.

7. A water cooled nuclear reactor as claimed in claim 1 or 3 in which the diaphragm is sealingly secured to the pressure vessel by bellow means.

8. A water cooled nuclear reactor as claimed in claim 6 in which the diaphragm is sealingly secured to the casing by bellow means.

9. A water cooled nuclear reactor as claimed in claim 1 or 3 in which the diaphragm is spring loaded.

10. A water cooled nuclear reactor as claimed in claim 6 in which the bellow means comprises a spring.

11. A water cooled nuclear reactor as claimed in claim 1 or 3 in which the diaphragm has damper means.

12. A water cooled nuclear reactor as claimed in claim 11 in which the diaphragm has at least one rod and piston, the casing having at least one cylinder, the at least one rod and piston being arranged to move coaxially within the cylinder to damp oscillations of the diaphragm.

13. A water cooled nuclear reactor as claimed in claim 7 in which the bellow means are arranged to expand with an increase in the volume or pressure of the water.

14. A water cooled nuclear reactor as claimed in claim 7 in which the bellow means are arranged to contract with an increase in the volume or pressure of the water.

15. A water cooled nuclear reactor as claimed in claim 2 or 3 in which the reactor core is arranged in the lower region of the second chamber, the primary water coolant circuit comprising a riser passage to convey relatively hot water to a heat exchanger, and a downcomer passage to convey relatively cool water from the heat exchanger to the reactor core.

16. A water cooled nuclear reactor as claimed in claim 15 in which the riser passage is defined by a hollow cylindrical member, the downcomer passage being defined between the hollow cylindrical member and the pressure vessel.

17. A water cooled nuclear reactor as claimed in claim 15 in which the heat exchanger is positioned in an upper region of the downcomer passage.

18. A water cooled nuclear reactor as claimed in claim 6 in which the reactor core is positioned in the lower region of the second chamber, the primary water coolant circuit comprising a riser passage defined by a hollow cylindrical member to convey relatively hot water to a heat exchanger, and a downcomer passage defined between the hollow cylindrical member and the pressure vessel to convey relatively cool water from the heat exchanger to the reactor core.

19. A water cooled nuclear reactor as claimed in claim 18 in which the casing is positioned coaxially with the hollow cylindrical member, the casing extending downwards from the pressure vessel into the hollow cylindrical member.

20. A water cooled nuclear reactor as claimed in claim 1 or 3 in which the pressure vessel has a vent to inter-connect the second fluid space with atmosphere.

21. A water cooled nuclear reactor as claimed in claim 20 in which the vent has a relief valve and the space between the diaphragm and the relief valve is filled with a predetermined mass of gas.

22. A water cooled nuclear reactor as claimed in claim 1 or 3 in which the diaphragm is an elastic membrane.

23. A pressurizer for a water cooled nuclear reactor comprising a pressure vessel, a diaphragm, the diaphragm being movable and being sealingly secured to the pressure vessel to divide the pressure vessel into a first space and a second space, sealing means being provided to interconnect and secure said diaphragm to the pressure vessel to form a seal and to allow relative movement between the diaphragm and the pressure vessel, the first space being arranged to interconnect with the water cooled nuclear reactor for the supply of water therebetween, the second space being arranged to contain a gas, the diaphragm being movable so as to allow changes in the volume or pressure of the water in the first space of the pressurizer and the water cooled nuclear reactor.

24. A pressurizer for a water cooled nuclear reactor comprising a pressure vessel, a diaphragm, the diaphragm being movable and being sealingly secured to the pressure vessel to divide the pressure vessel into a first space and a second space, the first space being arranged to interconnect with a water cooled nuclear reactor for the supply of water therebetween, the second space being arranged to contain gas, the diaphragm being movable so as to allow changes in the volume or pressure of the water in the first space of the pressurizer and the water cooled nuclear reactor, said diaphragm being sealingly secured to the pressure vessel by bellows means.

25. A pressurizer as claimed in claim 23 in which the diaphragm is sealingly secured to the pressure vessel by bellow means.

26. A pressurizer as claimed in claim 23 or 24 in which the diaphragm is spring loaded.

27. A pressurizer as claimed in claim 25 in which the bellow means comprises a spring.

28. A pressurizer as claimed in claim 23 or 24 in which the diaphragm has damper means.

29. A pressurizer as claimed in claim 25 in which the bellow means are arranged to expand with an increase in the volume or pressure of the water.

30. A pressurizer as claimed in claim 25 in which the bellow means are arranged to contract with an increase in the volume or pressure of the water.

31. A pressurizer as claimed in claim 23 or 24 in which the pressure vessel has a vent to interconnect the second space with atmosphere.

32. A pressurizer as claimed in claim 31 in which the vent has a relief valve.

33. A pressurizer as claimed in claim 23 or 24 in which the diaphragm is an elastic membrane.

* * * * *